United States Patent [19]

Kieslich

[11] Patent Number: 4,629,982

[45] Date of Patent: Dec. 16, 1986

[54] APPARATUS FOR DETECTING MOTION AND DIRECTION USING MAGNETORESISTIVE SENSORS PRODUCING SUM AND DIFFERENCE SIGNALS

[75] Inventor: Walter G. Kieslich, Blue Bell, Pa.

[73] Assignee: Transducer Systems, Inc., Kulpsville, Pa.

[21] Appl. No.: 510,285

[22] Filed: Jul. 1, 1983

[51] Int. Cl.[4] .................. G01B 7/14; G08B 21/00; H01L 43/00
[52] U.S. Cl. .................. 324/208; 338/32 R; 340/672
[58] Field of Search .............. 324/207, 208, 163; 340/671, 672; 338/32 R; 307/122

[56] References Cited

U.S. PATENT DOCUMENTS 4,039,936 8/1977 Jones et al. .................. 324/208
4,468,618 8/1984 Zander .................. 324/165

Primary Examiner—Ernest F. Karlsen
Assistant Examiner—Walter E. Snow
Attorney, Agent, or Firm—Jacob Trachtman

[57] ABSTRACT

A motion sensing means including a sensor head having a pair of magnetoresistive elements spaced apart less than one-half and preferably one-quarter of the wavelength of a cyclically varying characteristic of a body which is to have its motion sensed, processing means for deriving a sum signal and a difference signal from the sensing elements, and output means which receives the sum and difference signals and produces signals indicative of the direction of motion, velocity and relative position of the sensed body.

25 Claims, 5 Drawing Figures

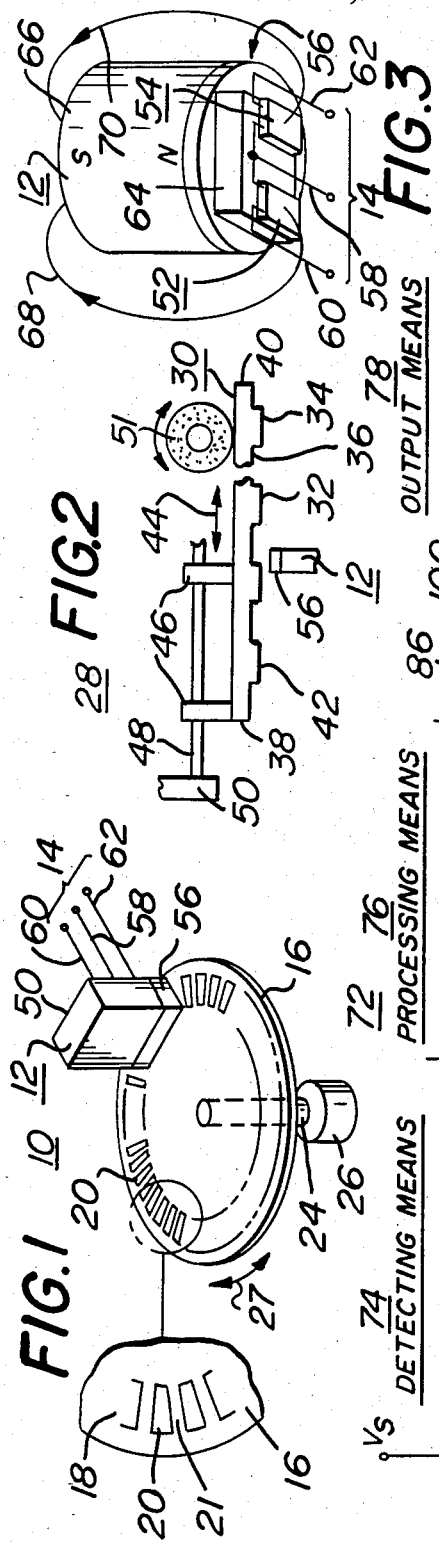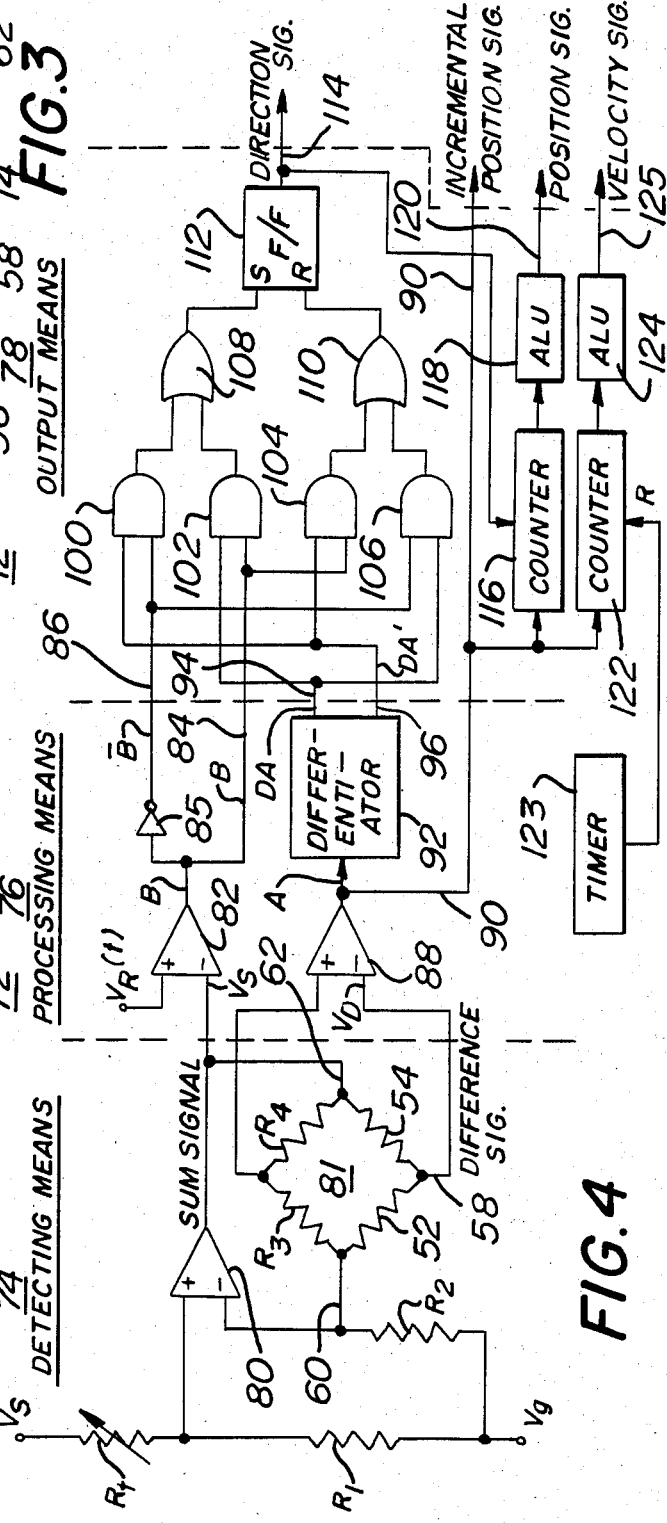

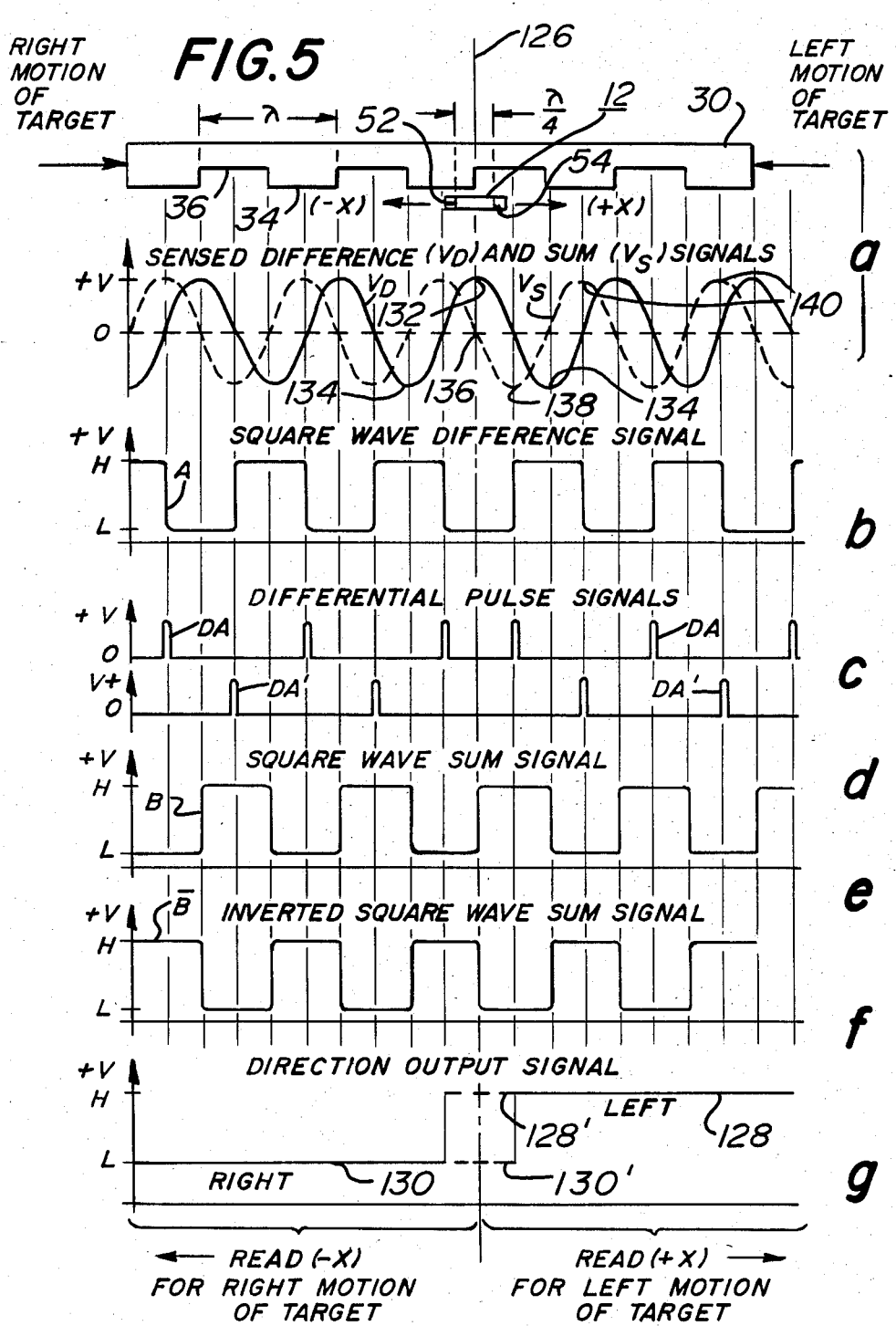

APPARATUS FOR DETECTING MOTION AND DIRECTION USING MAGNETORESISTIVE SENSORS PRODUCING SUM AND DIFFERENCE SIGNALS

BACKGROUND OF THE INVENTION

The invention relates to a sensing means and more particularly to a motion sensing means for detecting the direction of relative motion of a member.

Systems have been provided for sensing the position and incremental movement of a body as well as the direction of rotary and linear movement. Such systems generally have required a quadrature relationship between the sensing elements and a plurality of sensing elements which must be increased in number for improving the accuracy of the information provided as disclosed in U.S. Pat. No. 4,283,679 entitled Rotational Direction Detection Device For A Motor Or The Like. Although systems utilizing only two sensing components have been provided as disclosed in U.S. Pat. No. 4,142,152 entitled Sensing Arrangement, such arrangements do not provide high resolution and accuracy for small incremental movements and changes in direction of motion.

SUMMARY OF THE INVENTION

Therefore a principal object of the invention is to provide a new and improved motion sensing device of high resolution providing accurate information as to the position, motion, and direction of motion of a body.

Another object of the invention is to provide a new and improved motion sensing device which provides accurate indications of the position, motion and direction of motion of a body even when the body is moving at low speed or is stationary.

Another object of the invention is to provide a new and improved motion sensing device which does not require a quadrature relationship of spaced sensing elements for detecting the direction of motion of a body or a large member of sensing elements to provide highly accurate information.

Another object of the invention is to provide a new and improved motion sensing device which accurately senses position and small incremental changes in position, and indicates the speed of a body being sensed and its relative direction of motion.

Another object of the invention is to provide a new and improved motion sensing device which is inherently accurate and immune to common mode interference and drift effects.

Another object of the invention is to provide a new and improved motion sensing device which provides binary or digital output signals, is simple in construction and operation and may be manufactured at relatively low cost.

Another object of the invention is to provide a new and improved motion sensing device which requires the sensing of only a small portion of a body which is to have its motion detected, is compact, and relatively small in size, and is rugged in construction.

Another object of the invention is to provide a new and improved motion sensing device which is highly efficient in operation utilizes a minimum of components and requires minimum maintenance.

The above objects as well as many other objects of the invention are provided by a sensing means for determining the motion of a member comprising a detecting means including a pair of spaced sensing elements, each of which elements provides a respective output signal responsive to its position with respect to a member being sensed which has a cyclically varying characteristic. The sensing means includes a processing means which derives a sum signal and a difference signal from the sensing elements, and an output means which receives the sum and difference signals and delivers an output signal which is responsive to and indicative of the direction of the motion of the member.

The sensing elements have a spacing corresponding to less than one-half wavelength and preferably as small as approximately one-quarter of the wavelength of the varying characteristic of the member. The sensing elements preferably are magnetoresistive elements which when subjected to magnetic flux with densities corresponding to the varying characteristic of the member are operative for providing their respective output signals. The cyclically varying characteristic of the member sensed by the detecting means may be provided by a plurality of closely spaced ferromagnetic regions cyclically arranged to correspond to a substantially constant wavelength.

The first and second elements which each have first and second ends are connected in series by having their first ends joined together and their second end unjoined to each other. The processing means derives the sum signal of the detecting means from the unjoined ends of the sensing elements, while obtaining the difference signal of the elements from the joined ends. The sensing elements may be arranged in a bridge circuit providing first and second paths and two pairs of oppositely arranged junctions for respectively providing the sum and difference output signals.

The processing means includes first and second signal comparing means for receiving the sum and difference signals derived from the bridge circuit of the detecting means and respectively delivering a square wave sum signal and a square wave difference signal. The converting means receives the square wave signal from one of the comparing means and delivers an inverted square wave signal and an uninverted square wave signal, while the differentiating means receives the square wave signal of the other of the comparing means and delivers a first output pulse signal for each leading edge of the received signal and a second output pulse signal for each trailing edge.

The output means receives the signals of the converting and differentiating means and provides an output signal indicating the direction of motion of the member relative to the detecting means. The output means may include counting means responsive to signals derived from the detecting means for indicating the position of the member, while timing means may be included for determining the counting rate for indicating the velocity of the member. The counting means may include a reversible register which is also responsive to the signals of the processing means and signals indicative of the direction of motion for correspondingly reversing its counting sense with changes of direction in the motion of the member for indicating the displacement of the member.

The invention accordingly comprises an article of manufacture possessing the features, properties and relationship of elements which will be exemplified by the embodiments hereinafter described, with the scope of the invention being indicated by the claims.

DESCRIPTION OF THE DRAWINGS

For a fuller understanding of the nature and objects of the invention, reference should be had to the following detailed description taken in connection with the accompanying drawing, in which:

FIG. 1 is a perspective view of a motion sensing means embodying the invention,

FIG. 2 is a side elevational view illustrating another application of the invention, FIG. 3 is a perspective view of the sensor head shown in FIGS. 1 and 2 with its casing removed, FIG. 4 is a schematic electrical diagram partially in block form illustrating the invention, and FIGS. 5a-5g schematically and graphically illustrate the signals produced by the sensing means for motion of a target body to the left and to the right with respect to its sensing head.

Like reference numerals designate like parts throughout the several views.

DETAILED DESCRIPTION

FIG. 1 is a perspective view of a motion sensing means 10 embodying the invention, which comprises a sensor head 12 having power energizing and output signal lines 14. The head 12 is positioned to sense the motion of a coding disk or body 16 provided with a circular track or sensing path 18. The coding disk 16 may be made of a magnetic metal material and provided with radially extending equally spaced alternate air slots 20 and metal bands 21 along the path 18 for providing a cyclically varying characteristic. The varying characteristic is sensed by the head 12 for providing output signals on the lines 14. The relative motion of the head 12 along the path 18 may be provided by securing the center of the coding disk 16 to a shaft 24 supported by a bearing 26 for rotation in the clockwise and counterclockwise directions as shown by the arrows 27. The sensor head 12 will, accordingly, provide output signals for indicating its relative motion and the direction of its motion along the track 18, and the corresponding direction of rotation and motion of the disk 16. The signals of the sensor head 12 also indicate relative incremental movement and change of position, total distance traversed and the displacement of the head 12, the velocity of the head 12 with respect to the disk 16, and the disk revolution rate.

FIG. 2 illustrates an application of a motion sensing means 28 of the invention, in which the sensing head 12 is positioned proximate to the underside of an elongated member or body 30 having a varying structure 32 which provides a cyclically varying characteristic along its length. The body 30 may also be made of a ferromagnetic material and the varying structure 32 provided by alternating downwardly extending regions 34 and elevated regions 36 between its first and second ends 38 and 40 to provide a path 42 therebetween for being sensed by the head 12. The member or body 30 is mounted for reciprocating motions in the directions of the arrows 44 by attachment to brackets 46 which slidably receive a shaft 48 which is secured with a supporting structure 50. The member 30 may be actuated by a drive wheel 51 which engages its upper surface and rotates in the clockwise and counterclockwise directions for moving the member 30 to the left and right respectively along the bar 48. This causes relative motion of the sensor head 12 with respect to the member 30 along the path 42 which is linear. Since the sensor head 12 measures relative motion and direction, it may be mounted for movement along the path 42 while the member 30 is maintained in a stationary position, or if desirable the member 30 and the sensor head 12 may be arranged to provide for both moving independently of one another, for sensing the relative displacement and direction of motion of the member 30 with respect to the sensor head 12.

FIG. 3 is a perspective view of the sensor head 12 shown in FIGS. 1 and 2 with its cover 50 removed for exposing a pair of spaced sensing elements 52 and 54 at its end 56. The elements 52 and 54 are magnetoresistive components positioned proximate to respective tracks or paths 18 and 42 of the disk 16 and member 30 as shown in FIGS. 1 and 2. The elements 52 and 54, each of which has a pair of first and second leads or ends, are connected in series by having their first ends joined together and to a line 58, while their second ends are unconnected and joined respectively to lines 60 and 62 of the output lines 14. The resistance of each of the elements 52 and 54 changes between its first and second ends in response to the magnitude of magnetic flux to which it is subjected. The sensing elements 52 and 54 are positioned on the outer end surface of a pole piece 64 made of magnetic material positioned at an end of a bar magnet 66 having a north pole N and displaced from the south pole S at its opposite end. Magnetic flux is represented by the lines 68 and 70, showing flow through the pole piece 64 and the elements 52 and 54 from the north pole end to the south pole end of the magnet 66. Since the magnitude of the magnetic flux varies in accordance with the reluctance of the material along its flux path, the magnitude of the flux increases when its path through air is replaced by a material of lower reluctance such as by ferromagnetic or other such material. Accordingly, because of the varying characteristic of the disk 16 and member 30, the elements 52 and 54 of the heads 12 which are arranged along and proximate to their paths 18 and 42 have resistances determined by their respective locations. For example, when an element 52, 54 is next to a metal band 21 of track 18, the increased magnetic flux through the element increases its resistance, while its resistance decreases when it is over a slot 20 which reduces the magnitude of the flux therethrough. For the member 30, the changes in the air gap between the head 12 and the downwardly extending and elevated regions 34, 36 of the track 42 have a similar corresponding effects. The variable characteristic of the disk 16 and body 30 may also be provided by other arrangements which will be obvious to those skilled in the art for providing the respective changes in resistivity of the elements 52 and 54 as the sensing head 12 is displaced along the sensing path.

The cyclical variations of the characteristic of a body 16, 30 along its sensed path correspond to a substantially constant wavelength ($\lambda$). The sensing elements 52 and 54 are spaced apart along the path being sensed a distance of less than one-half wavelength ($\lambda/2$), and preferably one-quarter wavelength ($\lambda/4$) for providing high precision and accuracy in sensing changes in direction and incremental movements of the sensing head 12 along its path. Although the spacing of the elements 52 and 54 may be varied, spacing them apart less than one-quarter wavelength reduces the amplitude of the derived signals and results in a decrease of sensitivity and precision, while increasing their spacing although enhancing the amplitude of the output signals requires a greater displacement of the head 12 for updating the derived information. Since the sensor head 12 requires only one pair of closely spaced sensing elements 52 and 54, the invention provides a highly simplified, compact, and relatively small sensing structure of high precision for detecting direction of motion, speed, and displacement of the body being sensed.

Although particular forms of the coding disk 16 and elongated body 30 have been described, it will be evident that other bodies which provide varying characteristics capable of being sensed by the sensor head 12 may be utilized for providing the direction and speed of motion, and the position of such bodies. Since bodies providing such varying characteristics may also comprise a component of another device, the sensor head 12 may be positioned proximate thereto for relative movement along a continuous or reciprocating path to provide the desired information.

FIG. 4 is a schematic diagram of electrical circuitry 72 for the sensing means 10 and 28 of FIGS. 1 and 2. The circuitry 72 provides detecting means 74, processing means 76 and output means 78. The detecting means 74 comprises series connected resistors $R_t$ and $R_1$ bridging positive and negative voltage supplies $V_S$ and $V_g$. The resistor $R_t$ is temperature sensitive for varying its resistance to compensate for the effects of temperature variations on the operation of the circuitry 72. The junction of the resistors $R_t$ and $R_1$ is connected to the positive input of an operational amplifier 80 which has its other negative input connected to the negative supply voltage $V_g$ through a resistor $R_2$. The negative input of the amplifier 80 is also connected to the line 60 joined to the end of the magnetoresistive element 52, while a pair of series connected resistors $R_3$ and $R_4$ bridge the lines 60 and 62 of the series connected magnetoresistive elements 52 and 54 to form a bridge circuit 81. The line 62 is connected to the output of the amplifier 80.

The output of the amplifier 80 which provides a varying sum signal is also connected to the negative input of a signal comparator 82 of the processing means 76. The positive input of the comparator 82 is returned to a positive voltage source $V_r$ which provides a voltage which varies with temperature for stabilizing the operation of the circuitry 72. The comparator 82 in response to the varying sum signal on its negative input, delivers a square wave output signal B to its output line 84 and to a signal inverter 85 which provides an inverted square wave signal $\overline{B}$ on its output line 86.

A signal comparator 88 of the processing means 76 has its positive input connected to the junction of the resistors $R_3$ and $R_4$ of the detecting means 74, while its negative input is joined to the line 58, for receiving a varying difference signal from the bridge circuit 81. The difference signal is provided by the voltage difference between the junctions of the resistors $R_3$ and $R_4$, and of the magnetoresistive elements 52 and 54, as the resistances of the elements 52 and 54 vary. The comparator 88 delivers a square wave difference signal A to an output line 90 providing an incremental position output signal. The signal A is also delivered to the input of a differentiator 92 which delivers a pulse signal DA on its first output line 94 for each of the leading edges of the square wave input difference signal A. Its second output lead 96 correspondingly provides a pulse signal DA' for each of the trailing edges of the signal A.

The output means 78 of the circuitry 72 includes a plurality of "and" circuits 100, 102, 104, and 106, each having first and second inputs for receiving respective signals from the processing means 76, and providing output signals to one of a pair of "or" circuit 108 and 110. More particularly, the square wave signal B from the comparator 82 is delivered over line 84 to an input of the "and" circuit 102, while its other input receives the output pulse signal DA from the output line 94 of the differentiator 92. The inverted signal $\overline{B}$ also derived from the signal comparator 82 is delivered over line 86 to an input of the "and" circuit 100, while the other input of circuit 100 receives the differentiated pulse DA' over line 96 from the differentiator 92. The signal B from line 84 is also delivered to an input of the "and" circuit 104 while the other input of circuit 104 receives the differentiated pulse signal DA' over line 96. The "and" circuit 106 receives the inverted signal $\overline{B}$ from line 86 at one of its inputs, while its other input receives the differentiated signal DA from line 94.

With the concurrent receipt of signals at two of the inputs of an "and" circuit 100, 102, 104, 106, such circuit delivers an output signal to its respective "or" circuit 108, 110. The circuits 100 and 102 deliver their output signals to "or" circuit 108, while the circuits 104 and 106 provide their output signals to "or" circuit 110. When the "or" circuit 108 receives an input signal on either of its input lines, it delivers an output signal to a flip-flop circuit 112 which has set and reset states, placing the circuit 112 to its set state. In a similar manner, the "or" circuit 110 upon receiving an input signal at either of its inputs delivers an output signal to the flip-flop circuit 112 placing it in its reset state. The flip-flop circuit 112 delivers respective output signals for its set or reset condition to a line 114. The output signals delivered to the line 114 of the circuitry 72 are indicative of motion of the sensed body in a corresponding one of two direction. The signal over the line 90 also provides an output signal for the circuitry 72 representative of an incremental change in position of the sensed body.

The incremental position signal on line 90 may when delivered to a counter 116 provide an output signal representative of the distance traversed by the sensing device 12 along its path. If the counter 116 is of the reversible type for changing the sense of its count by receiving the direction signal from the output line 114 of the flip-flop circuit 112, it will indicate the displacement of the sensing device 12 along its path from a starting or selected position, and also the position of the member being sensed. The output signal from the counter 116 may be delivered to an arithmetic logic unit 118 for converting the count to desired units of measurement and for providing an output signal on line 120 of the circuitry 72 which indicates the position of the body being sensed.

For the purpose of indicating the speed or rate of revolution of the body being sensed, the incremental position signal on line 90 may be delivered to a counter 122 which also receives a hold count and reset signal from a timer 123. The hold count of the counter 122 which corresponds to the count during a predetermined interval of time is delivered to an arithmetic logic unit 124. The unit 124 indicates linear velocity or revolutions per unit time, as desired, for the body being sensed. Of course other arrangements of counters, timers and components may be provided for utilizing the signals generated by the output means 78 in accordance with design requirements and for providing information in digital or other desired forms regarding position, direction of motion, and motion of a body or member being sensed.

The incremental position signal on line 90 may also be derived from the output of the comparator 82, as well as by utilizing the pulse signals provided by the outputs of the differentiator 92, and from other signals of the circuitry 72. Similarly the output signal A of the comparator 88 may be delivered to the line 84 and the inverter 85, while the output signal B of the comparator 82 may be delivered to the differentiator 92 for obtaining the results and advantages of the invention.

In considering the operation of the circuitry 72, the signal delivered to the positive input of the amplifier 80 is maintained at a relatively constant value, and the circuitry of the operational amplifier 80 is designed to provide a negative feed back signal to its negative input from its output through the bridge circuit 81 for maintaining a substantially constant bridge current. Thus, when the resistance of the magnetoresistive element 52 increases while the resistance of the magnetoresistive element 54 decreases in the same amount, the total series or sum resistance remains the same, and the current through the bridge from the line 62 to the line 60 remains unchanged. The resistance drop across the resistor $R_2$ which receives the bridge current, provides an input signal to the amplifier 80, which also does not change. However, with such change in ratio of resistances of the elements 52 and 54, the voltage on the line 58 changes with respect to that at the junction of the resistors $R_3$ and $R_4$, providing a difference signal input to the comparator 88. When the resistances of the elements 52 and 54 both increase, their series sum resistance increases tending to decrease the current through the resistor $R_2$. This tends to reduce the voltage signal to the amplifier 80, increasing the difference between the signals to its positive and negative inputs, and the output voltage signal of the amplifier 80. The increase in output voltage, however, tends to maintain and stabilize the current through the bridge 81. The increased output voltage of the amplifier 80 is also provided as an increased input voltage or sum signal to the comparator 82. When the total series resistance of the elements 52 and 54 decreases, the current through the resistor $R_2$ tends to increase, increasing the voltage applied to the negative input of the amplifier 80. This in turn reduces the voltage output signal of the amplifier 80 to continue to provide the desired current stabilization for the bridge 81, while providing a decreased voltage or sum signal to the comparator 82.

With the variation of resistance of each of the sensing units 52 and 54 as the sensor head 12 moves relative to its path and senses the cyclically varying characteristic, the analog sum signal $V_S$ of the amplifier 80 varies in a manner which may be illustrated by the dashed sinusoidal curve $V_S$ of FIG. 5a. The difference signal $V_D$ produced by the bridge 81 and provided to the comparator 88 is represented by the solid curve $V_D$ which is shifted in phase with respect to the sum voltage signal $V_S$. In response to the analog difference signal $V_D$, the comparator 88 provide a square wave difference signal A shown by the curve A of FIG. 5b. Signal A alternates between low and high values L and H, each time the input signal $V_D$ crosses the dashed horizontal zero line of FIG. 5a. FIG. 5c illustrates the pulse DA provided by the differentiator 92 for the leading edges of the square wave signal A, when the member 30 of the sensing means 28 of FIG. 2 shown in FIG. 5a, moves to the left with respect to the sensor head 12, which corresponds to the sensing head 12 moving to the right of the center line 126. Corresponding pulses DA, shown to the left of the center line 126, are produced for the leading edges of the square wave difference signal A when the member 30 moves to the right or for the head 12 moving to the left. Accordingly, FIG. 5d illustrates the differential pulses DA' generated by the differentiator 92 and provided on output line 96 for the trailing edges of the square wave difference signal A.

In a similar manner, the comparator 82 which receives the sinusoidally varying signal $V_S$ provides the output signal shown in FIG. 5e as the square wave sum signal B. The signal B also varies between low L and high H values having a transition between values when the curve $V_S$ has a zero crossing. The sum signal $\overline{B}$ shown in FIG. 5f is the inverted signal B which varies by rising and falling between low L and high H values when the square wave sum signal B falls and rises respectively.

In relating the differential pulse signal DA of FIG. 5c with the signal B of FIG. 5e, it is seen that a pulse signal DA is delivered during the presence of a high level sum signal B only at locations to the right of the center line 126 corresponding to motion to the left of the member 30 or target of the sensing head 12. This results in an output signal to the "or" circuit 108 which places the flip-flop circuit 112 in its set condition. The high output signal which is produced by circuit 112 is represented by the line 128 of FIG. 5g which indicates motion of the body to the left. In a similar manner, the "and" circuit 100 also provides an output signal to the "or" circuit 108 for placing the flip-flop circuit 112 in a set condition, when it receives a differential pulse signal DA' shown in FIG. 5d in the presence of a high inverted square wave sum signal $\overline{B}$ shown in FIG. 5f also indicating motion to the left.

As described above, the "and" circuit 104 receives differential pulse signals DA' shown in FIG. 5d in the presence of a high square wave sum signal B when the target provided by the member 30 moves to the right with respect to the sensing head 12 in agreement with the signals shown to the left of the center line 126. With the delivery of a signal by the circuit 104 to the "or" circuit 110, it places a flip-flop circuit 112 in its second state. In this state the flip-flop circuit 112 provides a low level signal to its output line 114 represented by the line 130 of FIG. 5g indicating motion of the head 12 to the left and member 30 to the right. The delivery of pulse signals DA in the presence of a high square wave sum signal $\overline{B}$ also results in setting the flip-flop circuit 112 to its second state for indicating motion of the head 12 to the left and the member 30 to the right.

The dotted portions 128' and 130' which respectively are extensions of the lines 128 and 130, represent the state of the binary output signal of the flip-flop circuit 112 when the flip-flop circuit 112 is set for motion in one direction while the motion is changing to the opposite direction. The region in which the dotted portions 128' and 130' overlap corresponds to one-half wavelength ($\lambda/2$) of the cyclically varying characteristic of the member 30 being sensed and represents the maximum error encountered for indicating position or change of direction of the motion sensing means 28. Since the characteristic of the member 30 may be provided with the smallest wavelength which may be sensed by the head device 12, the overlapping region can be minimized and the accuracy enhanced accordingly.

For a description in greater detail of the relationship between the sensor head 12 and a body such as the member 30 for providing the signals $V_S$ and $V_D$ and the signals derived therefrom refer to FIGS. 5a–5g. FIG. 5a graphically illustrates the sensed difference and sum signals $V_D$ and $V_S$ and shows a spacing of the magnetoresistive sensing elements 52 and 54 of one-quarter wavelength ($\lambda/4$) of the periodic or cyclical variations having wavelength $\lambda$ provided by one complete extending region 34 and elevated region 36. When the elements 52 and 54 of the head 12 are positioned with one on each side of the center line 126, as shown in FIG. 5a, the element 52 receives maximum flux density, while the element 54 is subjected to minimum flux density. This results in the maximum difference in the signals produced by the elements 52 and 54 providing the sensed difference signal $V_D$ with a positive peak 132 which is repeated for each displacement of one wavelength $\lambda$. If the sensor head 12 is moved to the right or left by one-half wavelength ($\lambda/2$), negative peaks 134 of minimum value are produced. The negative and positive peaks 132, 134 of the difference signal $V_D$, thus, alternate each half wavelength ($\lambda/2$). As illustrated to the right of the center line 126, movement of the sensing head 12 from a positive peak 132 to a negative peak 134 in the positive direction (+x) produces a cross-over point for a falling signal, while the movement from a negative peak 134 to a positive peaks 132 provides a corresponding cross-over point when the signal is rising. As shown to the left of the center line 126, movement of the head 12 in the negative direction (−x) also provides corresponding symmetrically positioned peaks and cross-over points with respect to the center line 126.

When the sensor head 12 is centered on the center line 126 as illustrated in FIG. 5a, the sum signal $V_S$ is derived from the addition of the signals of the elements 52 and 54. The element 52 which is proximate to the extending portion 34 of the member 30 provides a maximum signal, while the element 54 which is positioned under the elevated region 36 provides a minimum signal. The maximum and minimum signals add to provide the zero value of the horizontal dashed line at the zero crossing point 136 for the negative going direction of the signal $V_S$ when movement of the head 12 is in the positive (+x) direction. As the head 12 moves to the right so that both magnetoresistive elements 52 and 54 are opposite an elevated region 36 which provides minimum flux density, the minimum or negative peak 138 is produced, and such negative peaks 138 are provided for each displacement of one wavelength ($\lambda$) along the member 30. The displacement of the head 12 so that it is positioned with both of its magnetoresistive elements 52, 54 equally proximate to an extending portion 134 subjects both to the maximum density of magnetic flux and produces the maximum sum resistance with corresponding output signals shown by the positive peaks 140 of the curve $V_S$. The movement of the sensor head 12 from a negative peak 138 to a positive peak 140 in the positive direction (+x) produces a zero cross-over point when the signal is rising, while the movement from a positive peak 140 to a negative peak 138 provides corresponding cross-over point when the signal is falling. Movement of the head 12 in the negative direction (−x) shown to the left of the center line 126 also provides corresponding symmetrical peaks and cross-over points with respect to the cross-over point 136 at the center line 126.

The motion sensing means described herein achieves many of its advantages by utilizing only two sensing elements to obtain sum and difference signals and provide the high precision results of the invention. The relationship of the sensing elements provides precise cross-over signals for particular locations of the sensed body which signals are immune to first order direct current (d.c.) drift and common mode interference for providing highly accurate output signals. Reducing the speed at which sensing takes place does not lower the precision of the output signals produced by the invention, due to the utilization of magnetoresistive elements. Such sensing elements provide an output signal even in the absence of motion for indicating the position of the body.

The elements are spaced less than one-half of the wavelength of a cyclically varying characteristic provided by the body being sensed, and preferably are spaced apart a distance of one-quarter wavelength, so that the information provided is updated for movements of one-half wavelength ($\lambda/2$) or less. In the present state of the art, commercially available magnetoresistive pairs of elements are available with a spacing as small as 0.025 inch. Better resolution will be possible as smaller separations are technologically achieved. Even though the elements are spaced as close as possible for increasing the precision of the output signals obtained, the head 12 is still operative in connection with disks and members having cyclically varying characteristics of other longer wavelengths, particularly since the spacing of the elements need not be arranged in quadrature for indicating direction of motion.

The sensing elements and associated components may be arranged in compact form for sensing only a small portion of the body which is to have its position and movement determined, and because of the small size and power requirements of present semiconductor devices may also include within the same unit other signal circuitry such as that disclosed. Thus, the sensing means 10 and 28, in addition to providing output signals on output line 90 and 114 of the circuitry 72, may also include within the same compact container other instrumentality such as the counters, timers and algebraic logic units for providing output signals on lines 120 and 125 for indicating position and velocity of the sensed body, and other signals which may be desirable and useful depending upon design requirements and conditions. The output signals may also be provided in binary, digital and other desirable forms.

The present invention may be carried out and embodied in other specific forms without departing from the spirit or essential attributes thereof, and accordingly, reference should be made to the appendaged claims, rather than the foregoing specification as indicating the scope of the invention.

What is claimed is

1. A motion sensing means comprising a detecting means including first and second spaced sensing elements each providing a respective output signal, the sensing elements being connected for concurrently producing a sum signal and a difference signal of their respective output signals, a member movable relative to the detecting means having a cyclically varying characteristic proximate to the sensing elements for being sensed by the detecting means, processing means deriving the sum signal and the difference signal from the sensing element and providing processed sum and difference signals, and output means receiving the processed sum and difference signals from the processing means and delivering an output signal responsive to the direction of motion of the member, the sensing elements have a spacing of less than one-half of the wavelength of the varying characteristic of the member for providing their respective output signals, the first and second elements of the detecting means each have first and second ends and are connected in series by having the first ends joined together and the second ends unjoined to each other, the detecting means includes stabilizing means for providing a substantially constant current through the series connected elements, and the processing means derives the sum signal of the detecting means from the unjoined ends of the sensing elements and derives the difference signal of the elements from the joined ends of the sensing elements, the detecting means includes a pair of series connected resistors and the sensing elements of the detecting means are connected across the pair of series resistors in a bridge circuit having first and second pairs of oppositely arranged junctions for respectively providing the sum and difference output signals, and the stabilizing means includes a negative feedback circuit for providing substantially constant current through the series connected elements and the series connected resistors of the bridge circuit.

2. A sensing means for determining the motion of a member having a cyclically varying characteristic comprising a detecting means including first and second spaced sensing elements each providing a respective output signal in response to its position with respect to a proximate relatively movable member having a cyclically varying characteristic, the first and second sensing elements being connected for concurrently producing a sum signal and a difference signal of their respective output signals, processing means deriving the sum signal and the difference signal from the sensing elements and providing processed sum and difference signals, and output means receiving the processed sum and difference signals from the processing means and delivering an output signal responsive to the direction of motion of the member, the sensing elements have a spacing corresponding to less than one-half of the wavelength of the varying characteristic of the member for providing their respective output signals, the first and second elements of the detecting means each have first and second ends and are connected in series by having the first ends joined together and the second ends unjoined to each other, the detecting means includes stabilizing means for providing a substantially constant current through the series connected elements, and the processing means derives the sum signal of the detecting means from the unjoined ends of the sensing elements and derives the difference signal of the elements from the joined ends of the sensing elements, the detecting means includes a pair of series connected resistors and the sensing elements of the detecting means are connected across the pair of series resistors in a bridge circuit having first and second pairs of oppositely arranged junctions for respectively providing the sum and difference output signals, and the stabilizing means includes a negative feedback circuit for providing substantially constant current through the series connected elements and the series connected resistors of the bridge circuit.

3. A motion sensing means comprising a detecting means including first and second spaced sensing elements each providing a respective output signal, a member movable relative to the detecting means having a cyclically varying characteristic proximate to the sensing elements for being sensed by the detecting means, the cylically varying characteristic of the member corresponding to a substantially constant wavelength and the sensing elements having a spacing of less than one-half of the wavelength of the varying characteristic of the member for providing their respective output signals, processing means deriving a sum signal and a difference signal from the output signals of the sensing elements, and output means receiving the sum and difference signals and delivering an output signal responsive to the direction of motion of the member, the first and second elements of the detecting means each having first and second ends and being connected in series by having the first ends joined together and the second ends unjoined to each other, the detecting means including a pair of series connected resistors and the sensing elements are connected across the pair of series resistors in a bridge circuit having first and second pairs of oppositely arranged junctions for respectively providing the sum and difference output signals, the processing means deriving from the junctions of the bridge circuit the sum signal of the detecting means from the unjoined ends of the sensing elements and deriving the difference signal of the elements from the joined ends of the sensing elements, the processing means including first and second signal comprising means for respectively receiving the sum and difference signals derived from the bridge circuit of the detecting means and respectively delivering a square wave sum signal and a square wave difference signal, converting means for receiving the square wave signal of the one of the first and second comparing means and delivering an inverted square wave signal and an uninverted square wave signal, and differentiating means for receiving the square wave signal of the other of the first and second comparing means and delivering a first output pulse signal for each leading edge of the received signal and a second output pulse signal for each trailing edge, and the output means receives the signals of the converting and differentiating means of the processing means and provides an output signal responsive to the direction of motion of the member with respect to the detecting means.

4. The sensing means of claim 3 in which the converting means receives the square wave sum signal of the first comparing means for delivering the inverted square wave signal and the uninverted square wave signal, and the differentiating means receives the square wave difference signal of the second comparing means and delivers the first output pulse signal for each leading edge of the difference signal and the second output pulse signal for each trailing edge.

5. The sensing means of claim 3 in which the output means includes a plurality of "and" circuits and "or" circuits, the "and" circuits receiving the signals of the converting and differentiating means of the processing means for responsively providing set and reset signals to respective ones of the "or" circuits, and a bistable means having set and reset states which receives the set and reset signals from the "or" circuits for being placed into a respective one of its states and delivering an output signal corresponding to its respectively state for indicating the direction of the relative motion of the member.

6. The sensing means of claim 5 in which the "and" circuits of the output means include first, second, third and fourth "and" gate circuits, the first and second "and" gate circuits receive the uninverted output signal and the third and fourth "and" gate circuits receive the inverted output signal of the converting means, the first and fourth "and" gate circuits receive the first pulse signals of the differentiating circuit of the processing means and the second and third "and" gate circuits receive the second pulse signals of the differentiating circuit, the first, second, third and fourth "and" gate circuits each provide an output signal upon receiving concurrent input signals, the "or" circuits of the output means include a first "or" circuit having inputs which receive the output signals of the first and third "and" gate circuits and delivers an output set signal in the presence of at least one signal to its inputs, and a second "or" circuit having inputs which receive the output signals of the second and forth "and" gate circuits and delivers an output reset signal in the presence of at least one signal to its inputs, and the bistable means receives the set and reset signals of the first and second "or" circuits and changes its state to accord with the last received signal.

7. The sensing means of claim 6 in which the output means includes counting means responsive to an output signal derived from the detecting means for indicating the position of the member with respect to the detecting means.

8. The sensing means of claim 7 in which the output means includes timing means for determining the counting rate of the counting means and the velocity of the member.

9. The sensing means of claim 7 in which the counting means is a reversible register receiving the output signal of the bistable means for correspondingly reversing its counting sense with changes of direction in the motion of the member.

10. The sensing means of claim 9 in which the output means includes timing means for determining the counting rate of the counting means and the velocity of the member.

11. The sensing means of claim 6 in which the sensing elements are spaced apart approximate one-quarter of the wavelength of the cyclically varying characteristic of the member, the detecting means includes magnetic means for providing magnetic flux extending through the magneto-resistive elements to the member being sensed, and the varying characteristic of the member is provided by ferromagnetic means which cyclically varies the density of magnetic flux through the elements respectively for producing the output signals, the member is rotatable about its axis to provide a circular path along which the member is proximate to the sensing elements for being sensed by the detecting means, and the magnetic means of the member comprises a plurality of closely spaced slot regions separated by ferromagnetic bands cyclically arranged along the path for corresponding to the substantially constant wavelength and being sensed by the detecting means.

12. The sensing means of claim 11 in which the output means includes counting means responsive to an output signal derived from the detecting means for indicating the position of the member with respect to the detecting means, and the output means includes timing means for determining the counting rate of the counting means and the velocity of the member.

13. The sensing means of claim 6 in which the sensing elements are spaced apart approximate one-quarter of the wavelength of the cyclically varying characteristic of the member, the detecting means includes means for providing magnetic flux extending through the magneto-resistive elements to the member being sensed, and the varying characteristic of the member is provided by ferromagnetic means which cyclically varies the density of magnetic flux through the elements respectively for producing the output signals, the member is supported for reciprocating movement relative to the detecting means to provide a path extending between first and second ends along the magnetic regions proximate to the sensing elements for being sensed by the detecting means, and the ferromagnetic means of the member comprises a plurality of closely spaced metallic regions cyclically arranged along the path for corresponding to the substantially constant wavelength and being sensed by the detecting means.

14. The sensing means of claim 13 in which the output means includes counting means responsive to an output signal derived from the detecting means for indicating the position of the member with respect to the detecting means, and the output means includes timing means for determining the counting rate of the counting means and the velocity of the member.

15. The sensing means of claim 3 in which th sensing elements are magnetic-resistive elements for sensing the varying characteristic of the member, the detecting means includes means for providing magnetic flux extending through the magneto-resistive elements to the member being sensed, and the varying characteristic of the member is provided by a plurality of closely spaced magnetic region for cyclically varying the density of magnetic flux through the elements respectively for producing the output signals, the relative movement of the member provides a path proximate to the sensing elements of the detecting means along which the magnetic regions are cyclically arranged to corresponding to the substantially constant wavelength.

16. The sensing means of claim 15 in which the converting means receives the square wave sum signal of the first comparing means for delivering the inverted square wave signal and the uninverted square wave signal, and the differentiating means receives the square wave difference signal of the second comparing means and delivers the first output pulse signal for each leading edge of the difference signal and the second output pulse signal for each trailing edge.

17. The sensing means of claim 15 in which the output means includes a plurality of "and" circuits and "or" circuits, the "and" circuits receiving the signals of the converting and differentiating means of the processing means for responsively providing set and reset signals to respective ones of the "or" circuits, and a bistable means having set and reset states which receives the set and reset signals from the "or" circuits for being placed into a respective one of its states and delivering an output signal corresponding to its state for respectively indicating the direction of the relative motion of the member.

18. A sensing means for determining the motion of a member having a cyclically varying characteristic comprising a detecting means including first and second spaced sensing elements each providing a respective output signal in response to its position with respect to a proximate relatively movable member having a cyclically varying characteristic, the sensing elements having a spacing corresponding to less than one-half of the wavelength of the varying characteristic of the member for providing their respective output signals, processing means deriving a sum signal and a difference signal from the output signals of the sensing elements, and output means receiving the sum and difference signals and delivering an output signal responsive to the direction of motion of the member, the first and second elements of the detecting means each having first and second ends and being connected in series by having the first ends joined together and the second ends unjoined to each other, the detecting means including a pair of series connected resistors and the sensing elements are connected across the pair of series resistors in a bridge circuit having first and second pairs of oppositely arranged junctions for respectively providing the sum and difference output signals, the processing means deriving from the junctions of the bridge circuit the sum signal of the detecting means from the unjoined ends of the sensing elements and deriving the difference signal of the elements from the joined ends of the sensing elements, the processing means including first and second signal comparing means for respectively receiving the sum and difference signals derived from the bridge circuit of the detecting means and respectively delivering a square wave sum signal and a square wave difference signal, converting means for receiving the square wave signal of the one of the first and second comparing means and delivering an inverted square wave signal and an uninverted square wave signal, and differentiating means for receiving the square wave signal of the other of the first and second comparing means and delivering a first output pulse signal for each leading edge of the received signal and a second output pulse signal for each trailing edge, and the output means receives the signals of the converting and differentiating means of the processing means and provides an output signal responsive to the direction of motion of the member with respect to the detecting means.

19. The sensing means of claim 18 in which the converting means receives the square wave sum signal of the first comparing means for delivering the inverted square wave signal and the uninverted square wave signal, and the differentiating means receives the square wave difference signal of the second comparing means and delivers a first output pulse signal for each leading edge of the difference signal and a second output pulse signal for each trailing edge.

20. The sensing means of claim 18 in which the output means includes a plurality of "and" circuits and "or" circuits, the "and" circuits receiving the signals of the converting and differentiating means of the processing means for responsively providing set and reset signals to respective ones of the "or" circuits, and a bistable means having set and reset states which receives the set and reset signals from the "or" circuits for being placed into a respective one of its states and delivering an output signal corresponding to its respective state for indicating the direction of the relative motion of the member.

21. The sensing means of claim 20 in which the "and" circuits of the output means include first, second, third and fourth "and" gate circuits, the first and second "and" gate circuits receive the uninverted output signal and the third and fourth "and" gate circuits receive the inverted output signal of the converting means, the first and fourth "and" gate circuits receive the first pulse signals of the differentiating circuit of the processing means and the second and third "and" gate circuits receive the second pulse signals of the differentiating circuit, the first, second, third and fourth "and" gate circuits each provide an output signal upon receiving concurrent input signals, the "or" circuits of the output means include a first "or" circuit having inputs which receive the output signals of the first and third "and" gate circuits and delivers an output set signal in the presence of at least one signal to its inputs, and a second "or" circuit having inputs which receive the output signals of the second and forth "and" gate circuits and delivers an output reset signal in the presence of at least one signal to its inputs, and the bistable means receives the set and reset signals of the first and second "or" circuits and changes its state to accord with the last received signal.

22. The sensing means of claim 21 in which the output means includes counting means responsive to an output signal derived from the detecting means for indicating the position of the member with respect to the detecting means.

23. The sensing means of claim 22 in which the output means includes timing means for determining the counting rate of the counting means and the velocity of the member.

24. The sensing means of claim 22 in which the counting means is a reversible register receiving the output signal of the bistable means for correspondingly reversing its counting sense with changes of direction in the motion of the member.

25. The sensing means of claim 24 in which the output means includes timing means for determining the counting rate of the counting means and the velocity of the member.

* * * * *